US006536241B1

United States Patent
Dupouy et al.

(10) Patent No.: US 6,536,241 B1
(45) Date of Patent: Mar. 25, 2003

(54) METHOD AND DEVICE FOR DRAWING OUT MINERAL WOOL FIBRES BY FREE CENTRIFUGING

(75) Inventors: Valerie Dupouy, La Chapelle en Serval (FR); Alain Debouzie, Le Petit Couronne (FR)

(73) Assignee: Isover Saint-Gobain, Courbevoie (FR)

( * ) Notice: Subject to any disclaimer, the term of this patent is extended or adjusted under 35 U.S.C. 154(b) by 0 days.

(21) Appl. No.: 09/446,111

(22) PCT Filed: Apr. 22, 1999

(86) PCT No.: PCT/FR99/00954

§ 371 (c)(1),
(2), (4) Date: Mar. 13, 2000

(87) PCT Pub. No.: WO99/55631

PCT Pub. Date: Nov. 4, 1999

(30) Foreign Application Priority Data

Apr. 24, 1998 (FR) .............................................. 98 05198

(51) Int. Cl.⁷ ................................................ C03B 37/05
(52) U.S. Cl. .............................. 65/456; 65/455; 65/520; 65/458
(58) Field of Search .......................... 65/455, 456, 520, 65/458

(56) References Cited

U.S. PATENT DOCUMENTS

| 3,709,670 A | 1/1973 | Eriksen |
| 4,119,421 A | 10/1978 | Alenrot et al. |
| 5,108,957 A | 4/1992 | Cohen et al. |
| 5,131,935 A | 7/1992 | Debouzie et al. |
| 5,356,450 A | * 10/1994 | Moller ........................ 65/456 |
| 5,468,274 A | * 11/1995 | Grove-Rasmussen ........ 65/455 |
| 5,520,488 A | 5/1996 | Obermeier |
| 6,037,284 A | 3/2000 | Holstein et al. |

FOREIGN PATENT DOCUMENTS

| WO | WO 92/06047 | 4/1992 |
| WO | WO 92/12940 | 8/1992 |
| WO | WO 96/36573 | 11/1996 |
| WO | WO 96/38391 | 12/1996 |

* cited by examiner

*Primary Examiner*—James Derrington
(74) *Attorney, Agent, or Firm*—Oblon, Spivak, McClelland, Maier & Neustadt, P.C.

(57) ABSTRACT

At least two machines placed side by side, including a series of centrifuging wheels arranged in a cascaded manner and driven in rotation about axes all having substantially in a same direction. Two consecutive wheels rotate in opposite directions, and are simultaneously fed with material to be fiberized. The material is poured onto the first wheel, is accelerated, and is conveyed onto the second wheel, and then optionally onto following wheels, in order to be converted into fibers by centrifugal ejection, the fibers being picked up by a gas stream and collected by a gathering device. The main axes of two adjacent machines are positioned along a non-zero angle adjusted in order for two gas streams emitted by the two adjacent machines to meet and combine. Such machines may find application in the manufacture of products based on mineral fibers.

12 Claims, 2 Drawing Sheets

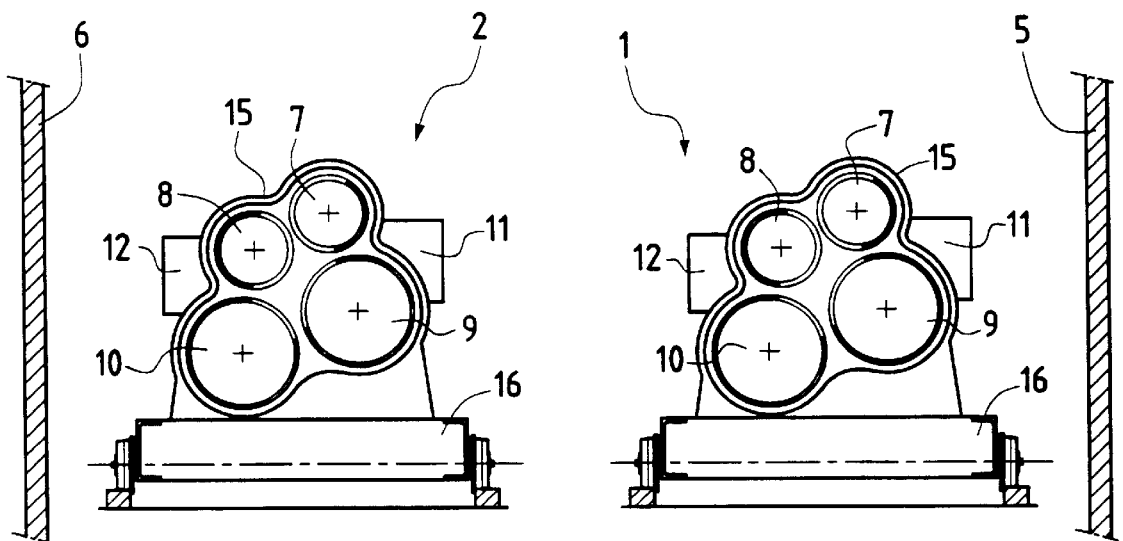
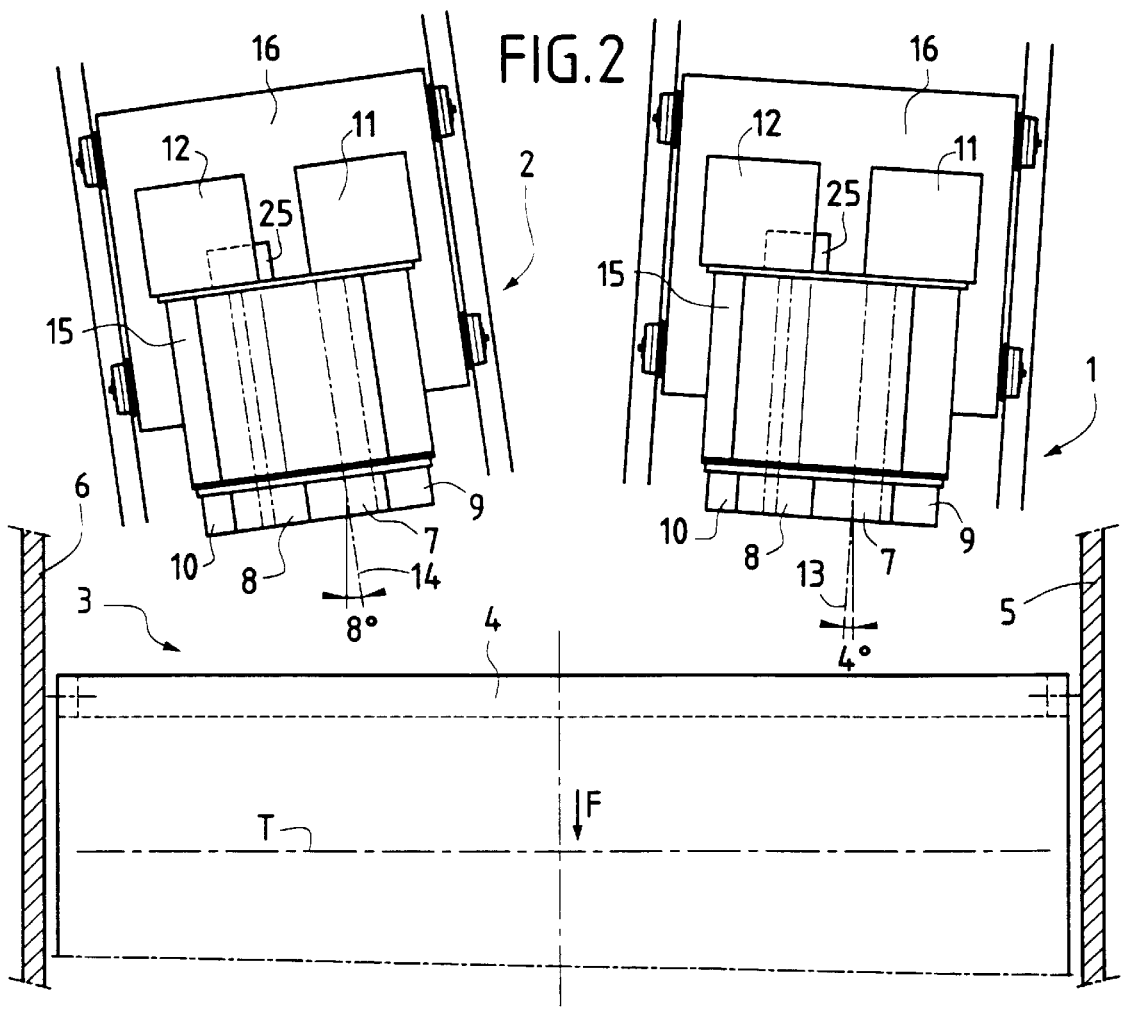

METHOD AND DEVICE FOR DRAWING OUT MINERAL WOOL FIBRES BY FREE CENTRIFUGING

BACKGROUND OF THE INVENTION

1. Field of the Invention

The present invention relates to the field of the manufacture of mineral fibres from a drawable material and in particular from a molten material with a high melting point, for example of basaltic glass or blast furnace slag type, for the purpose of the production of products, in particular insulating materials, based on mineral fibres. More specifically, the invention relates to an improvement to the so-called free centrifuging fiberizing techniques, in which techniques the material to be fiberized is conducted in the molten state to the periphery of centrifuging wheels and is entrained by these wheels so that a portion of the material is detached therefrom and is converted into fibres under the effect of centrifugal force and so that the remaining unconverted portion is conveyed to another wheel or, after the final wheel, falls to the ground in the form of shot.

2. Discussion of the Background

Use is generally made, for the implementation of the fiberizing techniques briefly restated above, of a machine comprising three or four wheels arranged in cascade and capable of rotating about substantially horizontal axes, two successive wheels on the path of the molten material rotating in opposite directions. The first wheel is fed with molten material via a spout and serves essentially to accelerate the material, which is conveyed to the second wheel and thus in succession to the final wheel, the flow of material diminishing at each wheel in proportion to the amount of fibres formed.

Such a machine generally comprises, in addition, means for generating a stream of air at the periphery of the centrifuging wheels for the purpose of assisting in the formation of the fibres by an effect of drawing and of picking up the fiberized material, separating it from the non-fiberized material (shot). This is because the latter is undesirable as it contributes to making the final product heavy and to making it particularly unpleasant to the touch. The air stream also has the function of conveying the fiberized material to a gathering device, for example a conveyor belt equipped with extraction boxes, which transports the fibres to the treatment devices downstream of the line, such as a lapper, an oven for polymerizing the binders, and the like.

The air stream is generally introduced in a direction substantially parallel to the axes of rotation of the wheels and thus entrains the fibres in a direction perpendicular to their direction of formation.

The amount of fibres manufactured depends on the flow rate of material poured onto the centrifuging wheels and on the efficiency of the fiberizing by the said wheels.

For a given machine, it is possible in theory to increase the productivity by increasing the flow rate of poured material but this can only be carried out within a relatively restricted margin. This is because a machine is designed with wheels of defined diameters intended to rotate at a predetermined speed. Beyond a certain flow of material feeding the machine, the centrifuging wheels gradually become clogged up, with direct harmful consequences on the quality of the fiberizing (due in particular to the modification of the temperature on each wheel and to the excess material to be treated by each wheel).

This fall in quality is reflected in the final product by a loss in properties, in particular in thermal insulation properties: it is only by increasing the relative density of the product that the desired value of the thermal conductivity coefficient lambda ($\lambda$) is achieved. The advantage resulting from the increased productivity is therefore found to be at least reduced thereby, if not completely nullified.

One alternative consists in using several fiberizing devices operating in parallel. The solutions provided to date nevertheless all have a certain number of disadvantages.

In a first known prior implementation of U.S. Pat. No. 3,709,670, two different sets of centrifuging wheels are placed side by side in the same vertical plane in the body of the same machine comprising two spouts for feeding with molten material. The two sets differ in that the first is the exact mirror image of the second with respect to a vertical axis, like its reflection in a mirror, two wheels at the same level rotating in opposite directions. This symmetrical arrangement is intended to prevent the air streams respectively emitted by each combination of centrifuging wheels from interfering with the other.

The major disadvantage of this symmetrical arrangement is economic in nature, because it is necessary permanently to have available two different sets of spare components and to carry out the maintenance and upkeep of two machines with different structures.

Another implementation is known from WO-A-92/06047, which is targeted at mitigating this disadvantage, where two identical fiberizing machines are placed side by side and fed in parallel with molten material. The machines are provided with air-blowing means, in combination with each of the centrifuging wheels, which generate an air stream close to the periphery of the wheel, the air stream having an axial movement component sufficient to take the fibres far from the fiberizing region and a tangential component sufficient to prevent interactions between the adjacent air streams.

To this end, the blowing means are composed of a drawing lip which borders the periphery of the wheel over a predetermined angular sector and within which are positioned air deflection fins inclined at an angle corotational with the rotation of the wheel, so as to direct the blown air with a tangential component which varies along the lip.

Such blowing means are also employed in the known device of WO-A-92/12940, which itself also comprises at least two identical fiberizing machines placed side by side and fed in parallel, in which machines the centrifuging wheels are small in diameter and have very high rotational speeds.

This arrangement of the blowing means nevertheless has the disadvantage of being complicated as it requires retaining an air stream adjusted to each of the centrifuging wheels. However, the deflection fins are sensitive components, in particular sensitive to vibrations due to the rotation of the wheels, which vibrations increase as the rotational speed increases. In addition, the deflection fins are exposed to being sprayed by shot with the risk of their inclination being affected in a way harmful to the direction of the air stream.

SUMMARY OF THE INVENTION

The aim of the present invention is to overcome these disadvantages and to provide novel means for making possible the production on a large scale of a product based on mineral fibres of good quality.

In this respect, the subject-matter of the invention is a process for the manufacture of mineral fibres, in which process at least two fiberizing machines placed side by side are simultaneously fed with material to be fiberized, each machine comprising a series of centrifuging wheels arranged in cascade and driven in rotation about axes all having substantially the same direction (so-called main axis), two consecutive wheels of the cascade rotating in opposite directions, the material to be fiberized being poured in the molten state into each machine at the peripheral surface of the first wheel, by which it is accelerated and is conveyed onto the second wheel and, optionally, successively onto the other wheels of the series, in order to be converted into fibres under the effect of the centrifugal force, and in which process the fibres formed by the various wheels of a machine are picked up by a gas stream, preferably emitted in a direction essentially parallel to the main axis of the said machine, and collected by a gathering device, characterized in that the main axes of two adjacent machines are positioned along a non-zero angle, this angle or each angle being adjusted in order for two gas streams emitted by the two adjacent machines to meet and combine.

This is because the inventors have demonstrated the fact that when the blowing gas emissions from two adjacent machines meet and are superimposed, this makes it possible to obtain a product based on mineral fibres of very good quality.

Thus, in the absence of any specific arrangement of the blowing means, such as those provided in the prior art in order to optimize the blown gas flow and consequently the path of the fibres produced, the use of two fiberizing machines positioned side by side with their main axes absolutely parallel results in a highly non-homogeneous product with a lack of cohesion and significant variations in relative density along the width of the gathering device. These failings cannot be entirely made up for in the subsequent stages of the process and the product exhibits relatively weak thermal properties.

In contrast to all expectations, since the prior art teaches that any interference between the gas streams of the two adjacent machines should be avoided, it emerges that the homogeneity of the product increases when the machines are oriented so that their respective gas streams meet and combine between two adjacent machines.

The inventors have found that the quality of the product is related to the homogeneity of the speeds of the fibres collected on the gathering device, the profile of the speeds of the fibres following the speed profile of the gas stream which transports the fibres.

When a single machine is used, this speed profile has a substantially Gaussian shape with a speed maximum at the centre of the chamber approximately opposite the centrifuging wheels, the speed decreasing in the direction of the walls of the chamber.

When two machines are placed side by side with their axes parallel without interaction of the adjacent gas streams, the movement of the gas streams about the centrifuging wheels is such that the speed profile of the total gas stream at the gathering device has substantially the shape of two Gaussian distributions beside one another, with a minimum approximately at the centre of the chamber and two maxima close to the walls, with a very significant variation in the speed modulus between a minimum and a maximum.

In accordance with the invention, it emerges that, if the machines are oriented so that the gas streams meet and are superimposed, not only is the formation of the fibres unharmed but a very homogeneous speed profile can be obtained.

Thus, the invention advantageously makes it possible, with a suitable orientation of the adjacent machines, to obtain a speed profile such that the axial component of the speed of the total gas stream at the gathering device varies by at most 20%, preferably by at most 15%, in particular by at most 10%, over a preferably central portion of the gathering device corresponding to at least approximately 50% of the width of the gathering device, preferably at least 60%.

Very good cohesion of the sheet of fibres which is collected on the gathering device is thus provided, with a homogeneous distribution of material (grammage).

Preferably, for better homogeneity, the angle between the main axes of two adjacent machines is adjusted in order for the axial component of the speed of the gas stream at the gathering device to vary in a substantially symmetrical way over the width of the gathering device.

In an advantageous embodiment, the fiberizing process on each machine is adjusted in order to promote the formation of fibres at the centre of the machine with relatively few fibres ejected on the sides of a machine, so as to make possible, between two machines, the movement of an air stream induced by the jets of gas resulting from the blowing means, which air stream will assist in the transportation of the fibres at a desired speed. To this end, the process according to the invention is advantageously such that each machine comprises a series of four centrifuging wheels, the arrangement and the rotational speed of the centrifuging wheels being adjusted in order for a portion of the material to be fiberized reaching the fourth wheel to be returned to the third wheel in order to be converted there to fibres.

Advantageous fiberizing conditions comprise the rotational drive of the second wheel of each series at a speed greater than or equal to 6500 rev/min, in particular greater than or equal to 8000 rev/min, for a wheel diameter of less than or equal to 240 mm, in particular of the order of 180 to 240 mm.

Under such conditions, the second wheel, which is smaller than normal, distributes a greater amount of molten material over the third wheel and consequently over the fourth. As a consequence, the latter two wheels of the series have a high temperature, which promotes the emission of fibres close to the point where the molten material has struck the wheel, to the detriment of emission on the sides of the machine. The double bounce on the third wheel makes it possible to regulate the amount of material fiberized by each of these wheels and to optimize the yield of the fiberizing.

With a greater amount of molten material which follows a path at the centre of the machine between the centrifuging wheels and the double bounce of the said molten material on the third wheel starting from the fourth, the process according to the invention provides greater projection of fibres at the centre of each machine via the lower parts of the third and fourth wheels. This specific spatial distribution of the fibres formed proves to be highly advantageous when at least two machines are positioned side by side.

Another subject-matter of the invention is a device for the manufacture of mineral fibres according to the process explained above. It mainly comprises two fiberizing machines placed side by side at the entrance of a chamber, each machine comprising a series of centrifuging wheels arranged in cascade and driven in rotation about axes all having with regard to one another substantially the same direction (so-called main axis), two consecutive wheels of the cascade rotating in opposite directions, and comprising blowing means generating, around the series of centrifuging wheels, a gas stream preferably essentially parallel to the main axis of the machine, the device comprising feeding means arranged so as to pour a material to be fiberized in the molten state simultaneously at the peripheral surface of the first wheel of each machine, and additionally comprising a gathering device positioned facing the fiberizing machines in the said chamber.

It is characterized in that two adjacent machines are positioned with their respective main axes forming a non-zero angle between them.

It is difficult to define in a general way a suitable orientation in order for the gas streams emitted by two adjacent machines to meet and combine.

This is because the movement of gas around and between the machines depends in particular on the aerodynamic shape of the surroundings of the machines, in particular on the shape of the chamber at the entrance of which the machines are installed, and on the operating conditions, in particular on the rotational speed of the centrifuging wheels and on the relative speeds of the jets of gas emitted close to the wheels.

In the majority of cases, it is advantageous to position two machines with their main axes converging toward the centre of the chamber. Nevertheless, in other configurations, it may happen, in contrast, that it is necessary to position the machines with their main axes diverging towards the sides of the chamber. A person skilled in the art is in a position to determine without difficulty the orientation suited to each configuration following a reasonable number of tests, the principle of which will be set out later.

Thus, in a first preferred form, the chamber having two vertical walls extending on either side of the gathering device in a substantially parallel way starting from the machines situated at the entrance, a first machine adjacent to the first wall and a second machine adjacent to the second wall are positioned with their respective main axes converging towards the centre of the chamber, preferably each with an angle of at least 2° with respect to the direction of the walls, in particular of the order of 2 to 10°.

In this embodiment, advantageously, the first machine is arranged so that its first centrifuging wheel conveys the molten material away from the first wall and the second machine is arranged so that its first centrifuging wheel conveys the molten material towards the second wall, and the axis of the second machine forms, with the second wall, an angle greater than that formed by the axis of the first machine with the first wall.

This difference in orientation is entirely surprising. This is because, in current practice, known fiberizing machines distribute the fibres in a fashion approximately centred over the width of the machine.

It might therefore have been expected to have to converge the two machines by the same angle with respect to the wall in order to obtain a symmetrical distribution of fibres with respect to the axis of the gathering device. Without wishing to be bound by any one scientific theory, it would seem that an asymmetric convergence is, on the contrary, rendered necessary by the fact that the blowing means produce a greater drawing gas stream on the side of the second and fourth wheels than of the first and third wheels, which is responsible for a greater wall effect on one side of the device: the drawing gas stream which borders the second wall (2nd side and 4th wheel) creates, along the second wall, a greater negative pressure than that created by the drawing gas stream which borders the first wall (1st side and 3rd wheel), due to the difference in gas flow rate of these two streams.

Preferably, the first angle is of the order of 2 to 6°, in particular of the order of 4°, and the second angle is of the order of 3 to 10°, in particular of the order of 4 to 8°.

In addition, the convergent arrangement reduces the emission of fibres towards the walls of the chamber and thus prevents the formation, from the fibres, of masses on the walls, these masses significantly affecting the qualities of the final product when they are entrained into the sheet of fibres.

In another embodiment, which can be of use in particular when the gathering device is relatively narrow, the chamber has two vertical walls which extend on either side of the gathering device while converging towards the latter. A first machine is then positioned adjacent to the first wall and a second machine is then positioned adjacent to the second wall, with their respective main axes each diverging towards the adjacent wall.

This orientation would make it possible to avoid the emitted fibres being excessively concentrated at the centre of the gathering device by the air streams induced along the walls by the rotation of the wheels and by the presence of the blown gas, which streams sweep into the funnel formed by the walls in the direction of the centre of the chamber.

As explained above, it is preferable in all the embodiments to arrange for the emission of fibres to be reduced on the sides of each fiberizing machine. In this respect, the device according to the invention advantageously comprises, in each machine, a second wheel having a diameter of less than or equal to 240 mm, in particular of the order of 180 to 240 mm.

The machines advantageously comprise third and fourth wheels with a greater diameter, in particular of the order of 300 to 400 mm.

In addition, in order to obtain a double bounce of molten material on the third wheel, it is advantageous to position the second wheel so that a line joining the centres of the first two wheels forms an angle of greater than 20°, preferably of the order of 25°, under the horizontal.

The centrifuging wheels can be arranged with respect to one another in a standard way in order to allow the establishment of the desired path of molten material between the wheels. An advantageous arrangement is such that the peripheral surface of a wheel is separated from the peripheral surface of an adjacent wheel by a distance of at least 35 mm, preferably of at least 40 mm.

Such a spacing allows the jet of fibres emitted by a wheel to fully expand without harmful interaction with the jet of fibres from an adjacent wheel, while ensuring good spatial distribution of all the fibres produced by the machine.

Another important characteristic in carrying out the fiberizing according to the invention is the control of the temperature of the centrifuging wheels. It has been seen that the temperature of a wheel depends in part on the amount of molten material poured onto this wheel. It is also influenced by the presence of blown gas streams at the periphery of the wheel. In order to avoid undesired cooling of the wheel, it is advantageous to prevent the gas stream from arriving with an excessively great angle of incidence on the peripheral surface of the wheel. The stream is preferably emitted in a direction such that it only grazes the peripheral surface of the wheel. This also has the effect of not disturbing the formation of the fibres. In this respect, it is advantageous for the blowing means to emerge close to a centrifuging wheel while departing from the axis of rotation of the wheel by an angle of the order of 10 to 16°, in particular of the order of 13°.

The blowing means can take highly varied forms. To prevent jets of fibres on the sides of a machine, it is nevertheless preferable to have blowing means in combination with a wheel in the form of a continuous orifice, in particular of an annular lip concentric with the wheel, in order not to break up the inflow of air. Such a continuous orifice will advantageously be such that the mean speed of the blown gas varies by at most 10% over the entire length of the orifice.

In an embodiment which is preferred from the viewpoint of the control of the emission of the fibres, the blowing means comprise one or more drawing lip(s) arranged so as to produce a continuous air stream bordering substantially the combined exterior of the peripheral surfaces of the centrifuging wheels.

To ensure efficient drawing of the fibres and to contribute to their transportation, when the fiberizing process is such that the fibres are emitted mainly in the lower part of at least one centrifuging wheel, the blowing means are advantageously arranged in order to produce a broader gas stream along a lower portion of the said wheel, in particular of the final wheel and optionally the penultimate wheel, of the cascade.

BRIEF DESCRIPTION OF THE DRAWINGS

Other characteristics and advantages of the invention will become apparent from the detailed description which will follow, made with respect to the appended drawings, in which:

FIGS. 1 and 2 represent two views, a front view and a top view respectively, of a device according to the invention.

DESCRIPTION OF THE PREFERRED EMBODIMENTS

Figure 3:
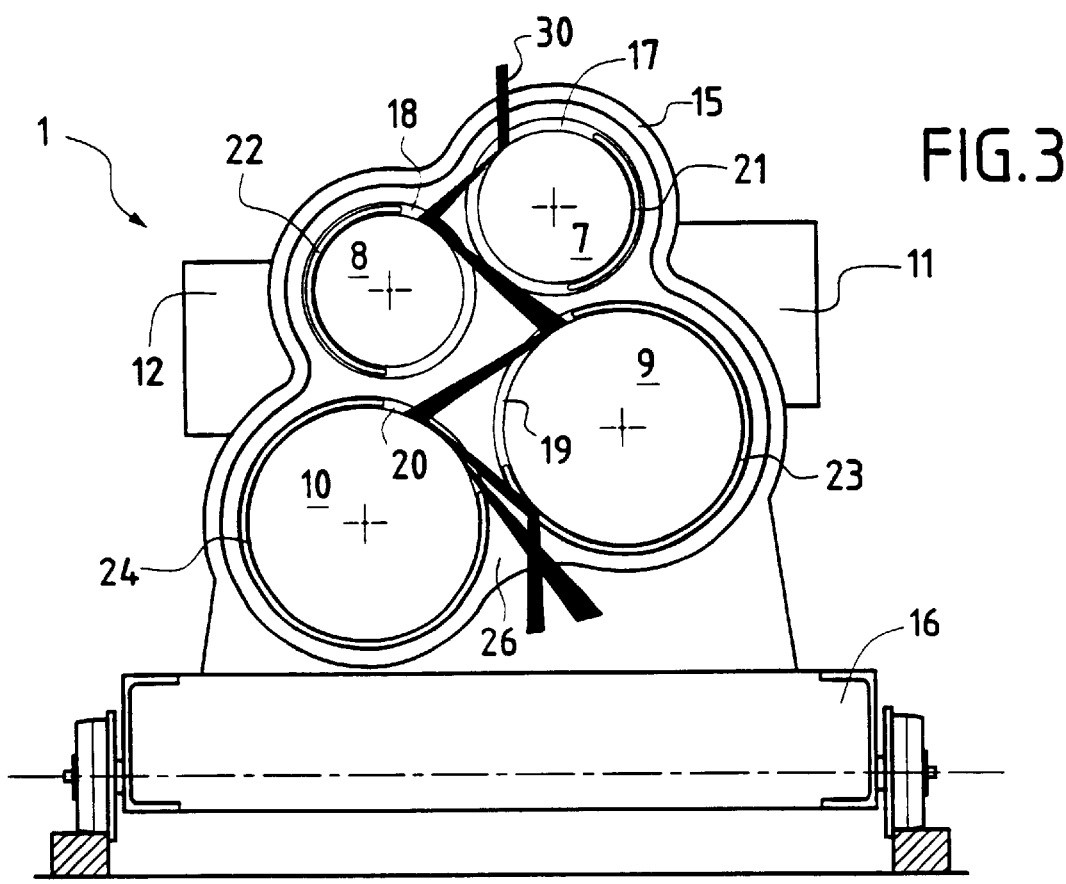
FIG. 3 represents a fiberizing machine forming part of the device of FIG. 1 when operating.

FIG. 1 is a front view of a fiberizing device according to the invention, seen from the fibre side. This device is essentially composed of two identical fiberizing machines 1, 2 positioned at the entrance of a chamber 3 for gathering the fibres, in which chamber is a gathering device, such as a conveyor belt 4, equipped with extraction boxes (not represented), moving between the two parallel vertical walls 5, 6 of the gathering chamber 3.

The two machines 1, 2 comprise a series of four centrifuging wheels 7, 8, 9, 10, in which the first wheel 7 is the smallest, the second wheel 8 is very slightly bigger, the third 9 and fourth 10 wheels being the biggest and substantially of the same diameter.

The wheels 7, 8, 9, 10 are positioned according to an assembly bringing their peripheral surfaces close to one another, distanced by the order of 40 mm. The line joining the centres of the first and second wheels 7, 8 forms an angle of approximately 25° under the horizontal.

These wheels 7, 8, 9, 10 are driven in rotation by means of unit power plants 11, 12. The two right-hand wheels 7, 9 are driven, for example, in the anticlockwise direction whereas the two left-hand wheels 8, 10 are driven in the opposite direction, so that two consecutive wheels on the path of the material to be fiberized (which descends from the higher wheel 7 to the lower wheel 10) rotate in opposite directions.

The four wheels 7, 8, 9, 10 are mounted on four shafts substantially parallel to one another which respectively define the main axes 13, 14 of each machine visible in FIG. 2. The shafts are present in a casing 15 shaped in order to match as closely as possible the contours of the internal components. The unit power plants 11, 12 are advantageously positioned sideways in a configuration which allows the air to move freely all around the casing 15.

In addition, the two machines 1, 2 are separated by an empty space which allows air to pass between the two machines. Likewise, the space situated on each side of the machines 1, 2 is left free in order to allow the passage of air induced between the machines 1, 2 and the walls 5, 6 of the gathering chamber 3.

Each machine 1, 2 is mounted on an underframe 16 resting on the ground on supports or wheels rolling on rails, which optionally makes it possible to move the machines in order to maintain them.

The rails are fixed to the ground so that the main axis 13 of the machine 1 forms an angle of approximately 8° with the direction of the walls 5, 6, which is also the axis of the gathering line (direction of forward progression of the belt 4 indicated by the arrow F), whereas the main axis 14 of the machine 2 forms an angle of approximately 4° with the direction of the walls 5, 6.

As an alternative form, the two machines 1, 2 could be mounted on rotating turrets which can be moved, if appropriate, for maintenance of the machines.

Each machine 1, 2 is additionally equipped with means for blowing drawing air composed of collars 17, 18, 19, 20 which are concentric with the wheels 7, 8, 9, 10 and which are provided with orifices 21, 22, 23, 24 forming drawing lips. The collars 17, 18, 19, 20 are advantageously positioned so that their external surface is coplanar with the rear face of the wheels 7, 8, 9, 10. The absence of any part projecting over the sides of the wheels prevents fibres from anchoring to the front of the machine, the accumulation of which between the wheels is harmful to the satisfactory operation of the machine.

The orifices 21, 22, 23, 24 border the peripheral surface of the wheels 7, 8, 9, 10 respectively over a length such that they allow the passage of a continuous gas stream following substantially the combined exterior of the peripheral surfaces of the wheels 7, 8, 9, 10.

The blowing air is conveyed towards the drawing lips by means of a blower 25 advantageously positioned in the bottom part of the casing 15: the air sucked from the surrounding atmosphere is injected inside the casing 15, where it moves all around the shafts driving the wheels, before exiting via the orifices 21, 22, 23, 24. The speed of the air is equalized as it moves in the casing 15 from the bottom towards the orifices 21, 22, 23, 24, so that the speed of the air ejected via an orifice only varies by at most 10% along the latter. The speed of ejection at the lip outlet varies according to the location of the collar in accordance with the space available for the air in the casing 15 around the shafts: it is maximum for the bottom collar 20 and minimum for the collar 17, which is the highest.

This equalization of the speed of the blown air by movement around a shaft makes it possible to optimize the drawing of the fibres on the associated wheel.

In addition, each machine 1, 2 can be equipped with means 26 for cooling the surface situated between the wheels 7, 8, 9, 10, in particular by circulation of water (water-jacket type). By virtue of the relatively large spacing between the wheels, this water jacket can be formed by a single part, providing cooling of the entire surface.

The collars 17, 18, 19, 20 are preferably arranged so as to be flush with the surface of the front of the machine 1, 2 which carries the wheels 7, 8, 9, 10, it being possible for this front, if appropriate, to be composed of the water jacket 26.

The operation of the device is set out below, the operating breakdown of a machine being illustrated in FIG. 3.

When a molten material, such as basaltic glass 30, is simultaneously poured onto the first wheel 7 of each machine 1, 2, the material 30 is accelerated on the wheel 7, which conveys it onto the wheel 8 and thus in succession onto the wheels 9 and 10. Mainly on the third and fourth wheels 9, 10 but also partly on the second wheel 8 and much less on the first wheel 7, a portion of the material entrained in rotation by the wheel is detached from the latter in the form of droplets, which are converted into fibres under the effect of the centrifugal force, whereas the remaining portion is conveyed to another wheel or, after the final wheel, falls to the ground in the form of shot. The flow of material passing from one wheel to another thus diminishes at each wheel in proportion to the amount of fibres formed.

The fibres formed by each wheel are drawn in the axial direction by the drawing air exiting from the lips 21, 22, 23, 24, which air partly provides for the transportation of the fibres to the gathering belt 4 in the chamber 3, where air is also being sucked out in the same axial direction.

The fibres received from the machines 1 and 2 are collected on the belt 4 in the form of a sheet with a thickness which varies according to the flow rate of molten material feeding the machines 1, 2 and according to the rate of forward progression of the belt 4. The machines 1, 2 also comprise means, known per se, for introducing a binder (not represented) which make it possible to bond the fibres to one another in the sheet.

As is seen in FIG. 3, the formation of fibres according to the invention advantageously mainly takes place in the central part of the machines 1, 2 by virtue of a suitable path of the molten material 30, which carries out a double bounce on the third wheel 9. In addition, this path is advantageous in providing a high fiberizing yield.

This path can be obtained by rotating the second wheel 8 at a sufficiently high speed for the jet of molten material to strike the third wheel at an impact point (or over an impact region) relatively close to the top of the third wheel. Advantageous fiberizing conditions comprise driving the second wheel of each series in rotation at a speed greater than or equal to 6500 rev/min for a wheel diameter of less than or equal to 240 mm.

The cooling of the surface between the wheels 7, 8, 9, 10 makes it possible to avoid the accumulation of hot molten material by adhesion to the front: on the contrary, the molten material 30 which may be ejected onto the front sets solid on cooling and falls under the effect of its own weight.

With a front thus kept permanently clean, the machines 1, 2 form fibres which have available a sufficient space around the wheels 7, 8, 9, 10 to open out in the form of a torus of fibres coaxial with the wheel in the direction of the gathering chamber 3.

Optionally, if the drawing lips 21, 22, 23, 24 are hollowed in an oblique fashion in the collars 17, 18, 19, 20, so as to emerge along an angle of the order of 10 to 16° with respect to the rotational axis of the wheels, the drawing technique can also contribute to the growth of a broad torus. Furthermore, the air blown in an oblique fashion avoids excessive cooling of the wheels and makes it possible to maintain the conditions for ejection of the fibres.

The drawing air streams, in combination with the rotation of the wheels at high speed, additionally result in the formation of air streams induced by the free movement of air between and around the fiberizing machines 1, 2.

The convergent orientation of the machines 1, 2 with respect to the direction of the walls 5, 6 of the gathering chamber 3 makes it possible to counter the wall effect by which the jet of fibres emitted by a machine is sucked towards the neighbouring wall under the action of the negative pressure created by the gas jets resulting from the blowing means along the walls. According to the invention, the blown and induced air streams emitted by the two adjacent machines converge, that is to say that they meet and combine in the frontal region situated between the machines 1, 2 and substantially move away from the walls 5, 6 to give improved conditions for drawing and transporting the fibres.

The sheet of fibres which is collected on the belt 4 exhibits good cohesion with a homogeneous grammage (absence of holes or of hollows in the sheet).

Figure 4:
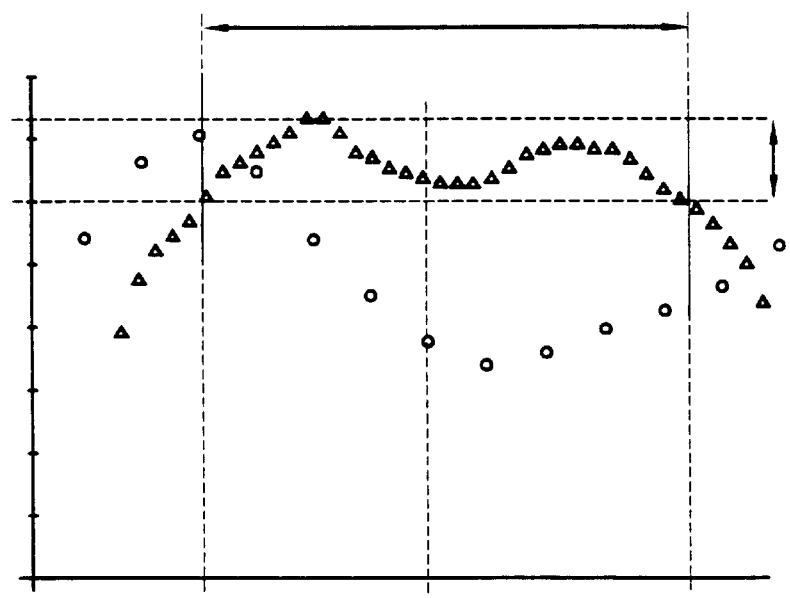
FIG. 4 represents a schematic diagram illustrating the distribution of the speeds of the gas streams emitted by the device according to the invention.

The effect of the orientation of the machines 1, 2 on the homogeneity of the fiberizing is illustrated by FIG. 4. In this figure, the variation in the speed component of the gas streams at the belt 4 in a horizontal direction parallel to the axis of the belt has been represented as a function of the position in width over the belt 4.

These speed measurements were carried out with a Pitot tube and a vane anemometer over several transverses T within the gathering chamber on the basis of 12 measurements evenly distributed over the width of the belt 4.

This speed profile is representative of the speed profile of the components thrown out by centrifugal ejection from fiberizing machines: this is because the same profile has been obtained by measuring the speeds of oil droplets present in the same gas flow produced by a ventilation experimental model on a ⅛ scale with respect to an industrial production line, the speed measurements being in this case carried out by a laser optical method, so-called Laser Doppler Anemometry. These measurements give detailed maps in two dimensions (2D) of the speed at any point in the gathering section, from which maps a graph can be drawn, such as that in FIG. 4.

This graph shows that when the machines are positioned with their respective main axes absolutely parallel to the axis of the gathering line and to the direction of the walls of the chamber, the speed profile exhibits a maximum at approximately a quarter (¼) of the width of the belt and a minimum at approximately two thirds (⅔) of the width of the belt, the speed again increasing over the final third. This speed profile illustrates the wall effect stated above. In addition, the variation in speed between the maximum and minimum is more than 30%. This results, as is confirmed by industrial reality, in a product which is highly non-homogeneous with regard to grammage, which exhibits a high number of holes and which exhibits little cohesion.

In contrast, when the machines are positioned so as to cause the gas streams to converge, a speed profile with very different variations is observed: two maxima at approximately one third (⅓) and two thirds (⅔) of the gathering width and a minimum approximately at half the gathering width, the variation in speed between these extremes being of the order of only 10%. By virtue of the very low variation in speeds over approximately 60% of the gathering width, the sheet of fibres obtained is very homogeneous and the product has highly satisfactory qualities.

The invention has just been described more particularly in the case of a gathering chamber with parallel walls. It also applies to plants having a different configuration, the orientation of the fiberizing machines then being modified according to the new conditions in order to obtain the desired speed profile. A study on a ventilation experimental model as described above advantageously makes it possible to determine the appropriate arrangement.

What is claimed is:

1. A process for manufacturing mineral fibers, comprising the steps of:

simultaneously feeding molten mineral to be fiberized to rotating peripheral surfaces of first centrifuging wheels of at least two fiberizing machines placed side by side in a chamber having walls, to accelerate the molten material;

conveying the material in a cascading fashion from the first centrifuging wheel of each of said at least two fiberizing machines to at least one further oppositely rotating centrifuging wheel of each of said at least two fiberizing machines so as to convert the material into fibers by centrifugal force; and using a gas stream generated by the at least two fiberizing machines to pick up the fibers and to collect the fibers in a gathering device, wherein rotational axes of the centrifuging wheels of each of said at least two fiberizing machines are substantially parallel, and wherein the rotational axes of the centrifuging wheels of a first of said at least two fiberizing machines are set at a non-zero angle with respect to the rotational axes of the centrifuging wheels of a second of said at least two fiberizing machines, said non-zero angle being selected such that the gas streams generated by said fiberizing machines meet and combine.

2. The process of claim 1, wherein the rotational axes of the centrifuging wheels of each of said at least two fiberizing machines are set at a second non-zero angle with respect to the walls of the chamber.

3. The process of claim 2, wherein said second non-zero angle is at least 2°.

4. The process of claim 1, wherein said non-zero angle is set such that an axial component of the speed of the total gas stream at the gathering device varies by no more than 20% over at least 50% of the width of the gathering device.

5. The process of claim 1, wherein said non-zero angle is set such that an axial component of the speed of the total gas stream at the gathering device varies substantially symmetrically over the width of the gathering device.

6. The process of claim 1, wherein each of said at least two fiberizing machines has four of said centrifuging wheels, and wherein a speed of said centrifuging wheels is set such that a portion of the material reaching the fourth wheel is returned to the third wheel to be converted to fibers.

7. The process of claim 6, wherein a second of said four centrifuging wheels of each of said at least two fiberizing machines has a diameter of no more than 240 mm, and is rotated at a speed of at least 6500 rev/min.

8. The process of claim 3, wherein one of said non-zero angle and said second non-zero angle is greater than the other of said non-zero angle and said second non-zero angle.

9. The process of claim 1, further comprising blowing means for generating a gas stream around the centrifuging wheels.

10. The process of claim 1, wherein the at least one further rotating centrifuging wheel has a diameter which is not greater than 240 mm.

11. The process of claim 9, wherein the blowing means comprises at least one drawing lip on said centrifuging wheels.

12. The process of claim 1, further comprising an open space between said at least two fiberizing machines.

* * * * *